United States Patent

[11] 3,548,103

[72] Inventors Balugani Fabio
Milan;
Franco Mammucari, Milan; Isidoro Poretti,
Castiglione Olona, Italy
[21] Appl. No. 636,164
[22] Filed May 4, 1967
[45] Patented Dec. 15, 1970
[73] Assignee Societa Italiana Telecommunicazioni
Siemens S.p.A.
Milano, Italy
a corporation of Italy
[32] Priority May 5, 1966
[33] Italy
[31] No. 10169/66

[54] TIME-ALLOCATION COMMUNICATION SYSTEM
13 Claims, 7 Drawing Figs.

[52] U.S. Cl. .......... 179/15
[51] Int. Cl. .......... H04j 5/00
[50] Field of Search .......... 179/15AS, AT, ART, 170.2, .6, 15A

[56] References Cited

UNITED STATES PATENTS

| | | | |
|---|---|---|---|
| 2,957,946 | 10/1960 | Kolding et al. | 179/15 |
| 3,030,447 | 4/1962 | Saal | 179/15 |
| 3,215,789 | 11/1965 | Hunter et al. | 179/170.6 |
| 2,958,733 | 11/1960 | Dickieson | 179/15 |
| 2,961,492 | 11/1960 | Carbrey et al. | 179/15 |
| 3,046,347 | 7/1962 | Miedema | 179/15 |

*Primary Examiner*—Kathleen H. Claffy
*Assistant Examiner*—David L. Stewart
*Attorney*—Karl F. Ross

ABSTRACT: Telephone communication system wherein two groups of subscribers, associated with opposite terminals of a two-way trunk line, are selectively connectable to that trunk line for transmission or reception during a fraction of an operating cycle or frame, the maximum number of subscriber lines so connectable in any one frame being half the total number of subscribers in each group, the transmitting section of each terminal having means for establishing an outgoing talking connection from an associated subscriber line only when the level of signals originating at that subscriber exceeds, for a predetermined period, the level of incoming signals addressed to the same subscriber so as to avoid message transmission from a subscriber line whose outgoing signals are only the echoes of incoming signals.

Figure 1A:
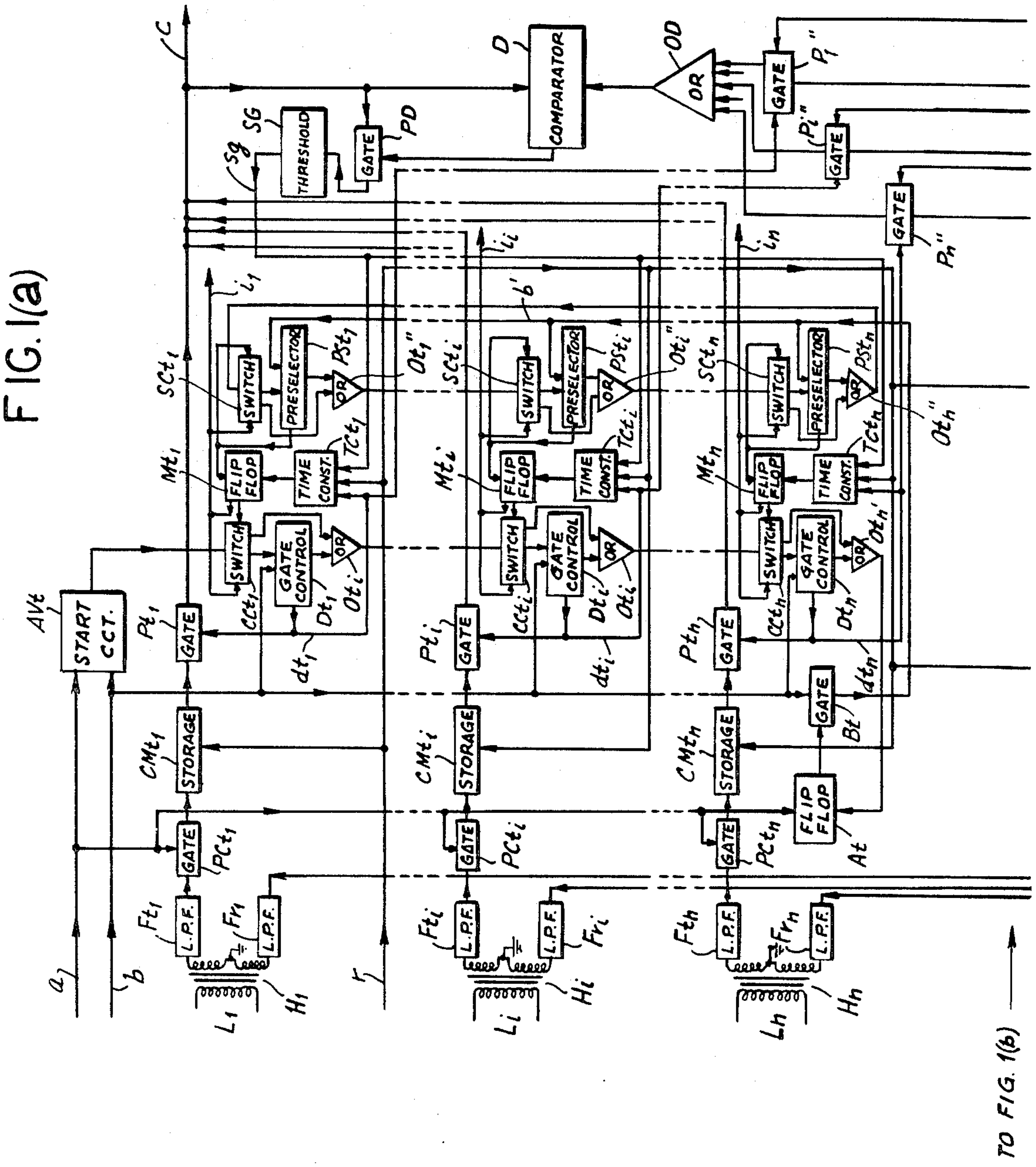

INVENTORS:
FABIO BALUGANI
FRANCO MAMMUCARI
BY ISIDORO PORETTI

Karl F. Ross
ATTORNEY

INVENTORS:
FABIO BALUGANI
FRANCO MAMMUCARI
ISIDORO PORETTI
BY
Karl F. Ross
ATTORNEY INVENTORS:
FABIO BALUGANI
FRANCO MAMMUCARI
BY ISIDORO PORETTI
Karl F. Ross
ATTORNEY INVENTORS:
FABIO BALUGANI
FRANCO MAMMUCARI
ISIDORO PORETTI
BY Karl F. Ross
ATTORNEY

TIME-ALLOCATION COMMUNICATION SYSTEM

Our present invention relates to a two-way communication system, specifically a telephone system, in which signals from simultaneously communicating (e.g. talking) subscribers on one end of a common trunk line are sampled to produce information which, usually in coded form, is consecutively transmitted over the trunk line to a remote terminal within a short operating interval, preferably on the order of 100 microseconds, for distribution to respective subscriber lines at the other end. Such systems have become known as time-sharing or time-allocation systems.

In commonly owned Pat. application Ser. No. 445,333, filed 19 Apr. 1965, there has been disclosed a telephone communication system of this type wherein, with a group of $n$ subscriber lines connected to each terminal of the trunk line, only a lesser number $n$ of such subscriber lines are connected in any operating cycle or frame to the trunk for either transmitting or receiving purposes. Since, in practice, even at full-capacity operation only a fraction of the available subscriber lines (half their number, on the average) will be used for transmission whereas the remainder are employed for reception, traffic is not materially impeded even if $m$ is as low as $n/2$. Our present invention is directed to an improvement over this earlier system.

In the prior system, as well as in a system according to our present invention, the criterion used in selecting a given subscriber line for connection to the transmission channel of the trunk line is the signal level appearing, during any frame, on the outgoing branch of such subscriber line. In the earlier system, as described in the above-identified U.S. application and in corresponding Italian Pat. No. 735,908, the magnitude of an intelligence pulse transmitted from a given subscriber line over the trunk line to the opposite terminal is registered at the local terminal in an integrating network which, after the voltage level thereof has surpassed a predetermined limit, causes seizure of the outgoing branch of that particular subscriber line which thereupon is periodically connected to a pulse coder for delivery of a corresponding combination of code pulses to the transmission channel of the trunk. Since, however, unavoidable reflections at the subscriber station may cause incoming pulses from the receiving channel of the trunk to give rise to spurious echoes which the testing circuit may misinterpret as original intelligence even though the outgoing branch of the subscriber line is idle, means were provided in that system for blocking the talking circuits of any subscriber line whose incoming branch was receiving signals from the trunk.

Thus, the earlier system had the disadvantage that a party at one end of the trunk line, communicating with another party at the opposite end, could not break in on a conversation carried on by the latter party but had to await the cessation of intelligence signals arriving over the trunk in the time slot assigned to this particular connection.

The general object of our present invention is to provide an improved system of this type which eliminates the disadvantage described.

A more particular object of the invention is to provide means for effectively discriminating between true outgoing signals and echoes of incoming signals on any subscriber lines for the purpose of permitting the establishment of a talking connection only for the transmission of intelligence actually originating with a particular subscriber.

These objects are realized, pursuant to our present invention, by the provision of a comparison circuit such as a differential amplifier which is connectable across the incoming and outgoing branches of any subscriber line in order to determine the relative signal strength thereof. If the level of the outgoing signals exceeds that of the incoming signals, as will usually be the case when the local subscriber is talking even though the distant subscriber may also be transmitting, a switching stage individually assigned to this local subscriber is enabled at some point during a frame to connect the outgoing subscriber line to the transmission channel of the trunk. This will take place, according to a more specific feature of our invention, after a threshold device in the transmitting section of the terminal equipment has generated a series of control pulses in successive operating cycles or frames, these control pulses being registered in a time-constant network which eventually produces an output effective to seize the outgoing branch of the subscriber line shortly after the subscriber has begun talking, but with a delay sufficient to prevent spurious activation in response to transient voltages. The time constant of this network should be sufficient to prevent interruption of conversation between syllables.

The output voltage of the time-constant network may control a gate for the passage of a cancellation signal which, in accordance with a further feature of our invention, is generated after the outgoing branches of talking subscriber lines have been successively connected to the transmission channel of the trunk line and before a distribution message is sent over the trunk to the remote terminal in order to set the switches of the receiving section thereof for proper routing of the coded message pulses to be transmitted thereafter. Thus, as disclosed in the prior U.S. application and the Italian patent identified above, each frame may be subdivided into an address portion for the transmission of the distribution message and an intelligence portion for the transmission of the talking codes; in the latter portion, after the successive transmission of the intelligence from $p$ talking subscribers where $p < m$, *the balance of* $(m - p)$ timing pulses available in the frame may be used to test the outgoing branches of hitherto idle subscribers to prepare their activation if they should now be found talking. Upon such testing, a bistable element associated with each of the $(m-p)$ subscriber lines so preselected is provisionally set, subject to a resetting by the aforementioned cancellation signal if the latter is not blocked by a sufficient charge on the corresponding time-constant network. By generating this cancellation signal at the very end or beginning of each frame, we prevent the inclusion in the distribution message of address information relating to idle subscribers; this eliminates noises engendered by the searching of the test equipment for newly active subscribers.

In telephone networks and similar two-way communication systems, as herein contemplated, situations may exist in which a subscriber must send out signals at a relatively low level during reception of incoming intelligence; a typical instance is the automatic transmission of data from a recording device which may be controlled by signals from the receiving party, e.g., for the purpose of repeating part of a message. In order that our system may be operative also under such circumstances, we prefer to connect our comparison circuit to the incoming branch of a subscriber line not directly but by way of a circuit component discriminating between received signals of shorter and longer duration. This component may include a first integrating network of relatively short time constant (preferably on the order of one frame) whose output is fed to the comparison circuit, and which may discharge over a somewhat longer period (say, 10 microseconds), and a second integrating network of relatively long time constant, e.g., on the order of a second, which blocks the transmission of the output of the first network to the comparator. Upon sustained reception of intelligence by the incoming branch of a subscriber line, therefore, the corresponding outgoing branch will be enabled regardless of the relative signal levels.

Figure 1B:
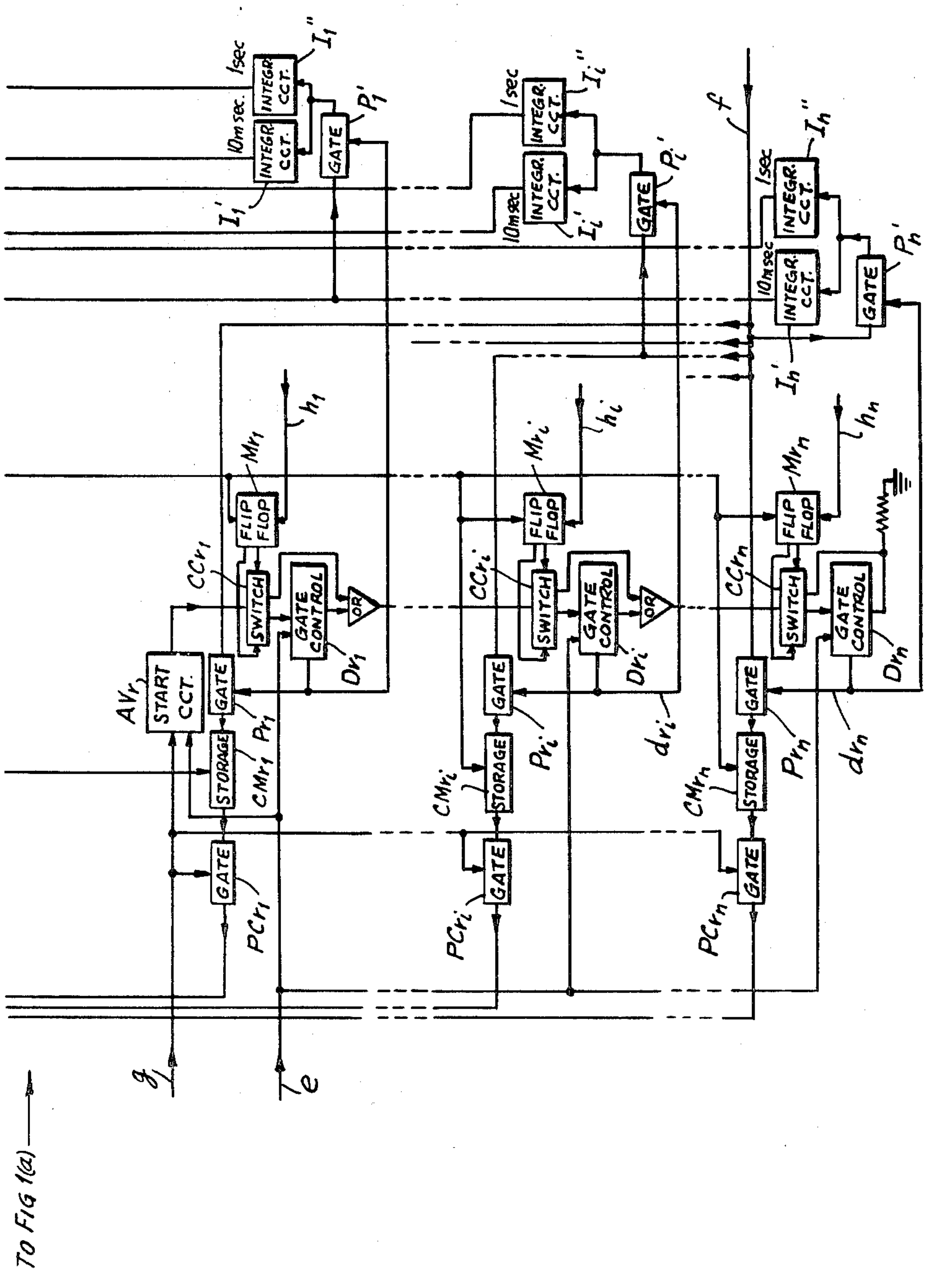
Figure 6:
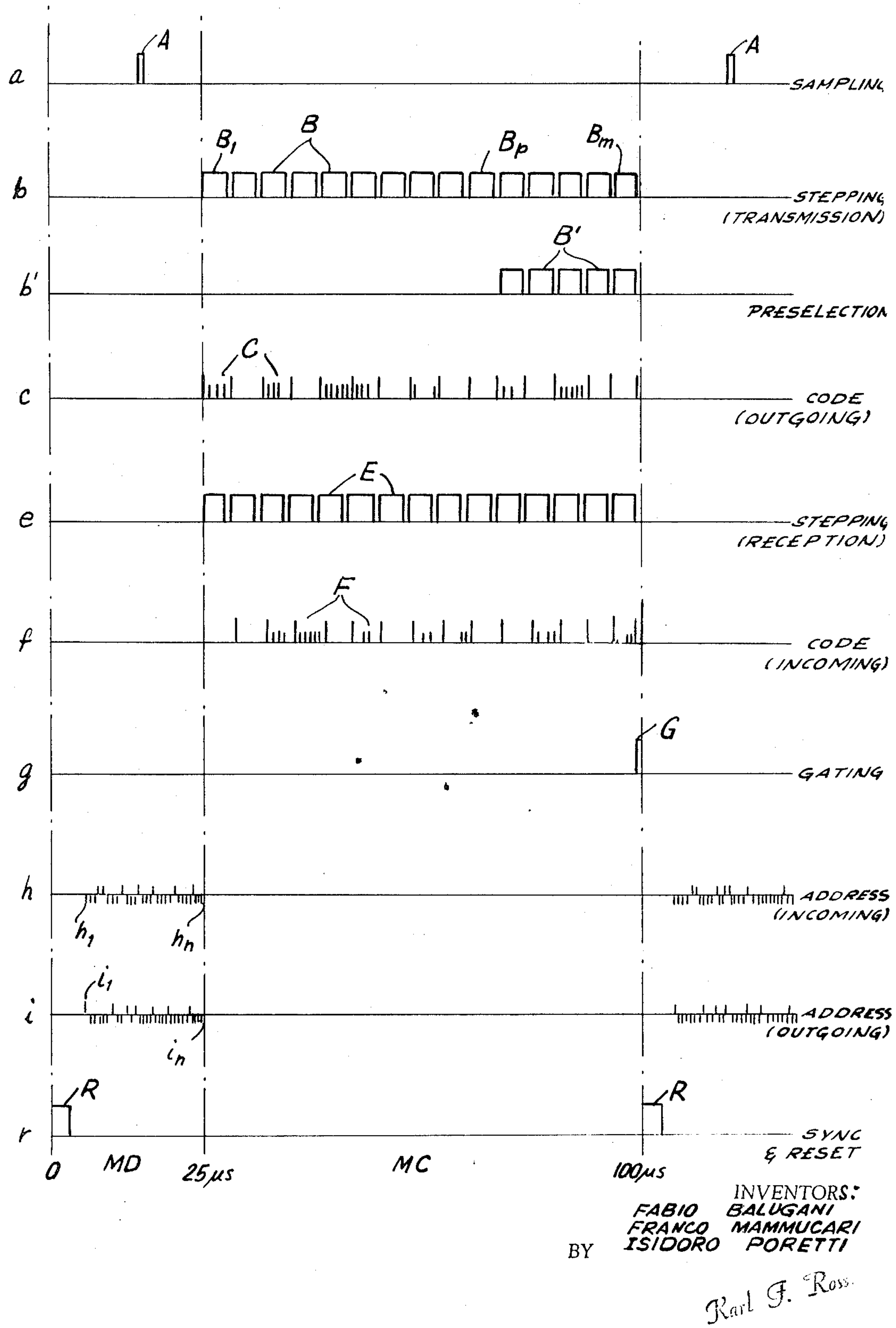

The invention will be described in greater detail with reference to the accompanying drawing in which:

FIG. 1, split into two complementary sections ($a$) and ($b$,) is a circuit diagram illustrating the overall organization of a trunk-line terminal serving $n$ subscriber lines;

FIGS. 2, 3, 4 and 5 are detailed representations of certain circuit elements shown in FIG. 1; and FIG. 6 is a timing diagram illustrating the sequence of pulse generation and signal transmission in the system of FIG. 1.

Reference will first be made to FIG. 1 for a description of our improved terminal equipment as used in a time-sharing system of the general type disclosed in the copending application Ser. No. 445,333 referred to above. The terminal shown in FIG. 1 is divided into a transmitting section, whose elements are identified by the postscript *t*, and a receiving section, whose elements bear the postscript *r*. Of the *n* subscriber lines served by this terminal, only the first line $L_1$, an intermediate line $L_i$ and the last line $L_n$ have been shown. Components individual to these several lines have been identified by subscripts 1, *i* and *n*, respectively. Since these components are identically duplicated in each subscriber circuit, only the components associated with line $L_i$ will be described in detail hereinafter.

A two-way trunk line associated with the terminal of FIG. 1 has been represented by a conductor *c*, forming part of a transmission channel, and a conductor *f*, forming part of a reception channel. Included in these channels is conventional coding and decoding equipment, not shown, for translating a potential on conductor *c* into a combination of outgoing code pulses and reconverting an incoming combination of such code pulses into a signal voltage on conductor *f*. Other conductors common to all subscriber lines are a lead *a* for the transmission of sampling pulses A (see also FIG. 6); a lead *b* for the delivery of stepping pulses B to the transmitting section; a lead *r* serving as a source of cancellation and synchronizing pulses R; a lead *e* for the delivery of stepping pulses E to the receiving section; and a lead *q* for the supply of gating pulses G to pass the signal voltages from the receiving section to individual subscriber lines. Also included are individual leads $i_1, \ldots i_i, \ldots i_n$ for the delivery of outgoing address signals to the remote terminal via the transmission channel of the trunk and $h_1, \ldots h_i, \ldots h_n$ for the distribution of incoming address signals from the reception channel to the several subscriber circuits. The generation of the several types of pulses is under the control of a timer of which only the above-enumerated leads have been illustrated.

Line $L_i$ is connected via a hybrid coil $H_i$ to an outgoing branch, comprising a low-pass filter $Ft_i$, and an incoming branch, comprising another low-pass filter $Fr_i$. Filter $Ft_1$, designed to suppress transients, works through a gate $PCt_i$ into a storage circuit $CMt_i$ described in greater detail hereinafter with reference to FIG. 5. This circuit, essentially a condenser, stores a potential representing an amplitude sample of an audiofrequency wave passed by filter $Ft_i$. Another gate $Pt_i$ normally blocks transmission of this voltage to talking conductor *c*.

Gate $Pt_i$ is controlled by a circuit $Dt_i$ which in turn is under the control of a routing switch $CCt_i$. The switches $CCt_1$ to $CCt_n$ and the gate-control circuits $Dt_1$ to $Dt_n$ represent respective stages of a counting chain which also includes a starting circuit AVt controlled by pulse A (FIG. 6) from conductor *a*. Each counting stage further comprises a flip-flop such as element $Mt_i$, which controls the associated switch $CCt_i$ to determine whether the gate control $Dt_i$ of this particular counting stage is to be activated or bypassed. The bypassing output of switch $CCt_i$ and the output of gate control $Dt_i$ are joined in an OR circuit $Ot_i$ which produces the input for the next-following stage. Gate control $Dt_i$ also has an input connected to lead *b* in order to receive therefrom the stepping pulses B.

In addition to the counting chain $CCt_1$ —$CCt_n$ and $Dt_1$ —$Dt_n$, the transmitting section of the terminal includes a preselection chain comprising switches $SCt_1$ —$SCt_n$ and preselector stages $PSt_1$ —$PSt_n$. Switch $SCt_i$ controls the stage $PSt_i$ by its first output and has its second output, bypassing that stage, connected to an OR circuit $Ot_i$ which also receives the output of preselector stage $PSt_i$, the arrangement being analogous to that of the associated counting stage. A further input of preselector circuit $PSt_i$ is connected to a bus bar *b'* which forms an extension of conductor *b*, being separated from it by a gate Bt under the control of a flip-flop At. The latter flip-flop is set by the output of the final OR circuit Otn' of the counting chain and is periodically reset by the pulse A on conductor *a*.

Flip-flop $Mt_i$, which applies a distribution signal to an outgoing address lead $i_i$ after having been set by a pulse from the corresponding preselector $PS_i$, can be reset by the pulse R (FIG. 6) from lead *r* if this pulse clears an associated time-constant network $TCt_i$ under conditions described hereinafter with with reference to FIG. 2. Network $TCt_i$ also received input signals from gate control $Dt_i$ and from a comparison circuit D, e.g., a differential amplifier, which is common to all the stages and works through a gate PD into a threshold device SG having its output lead *sq* connected in parallel to all the time-constant networks $TCt_i$ —$TCt_n$.

The receiving section of the terminal includes a counting chain with switches $CCr_1$ —$CCr_n$ and gate control circuits $Dr_1$ —$Dr_n$ similar to the aforedescribed counting chain of the transmitting section. Switch $CCr_1$ is controlled by a flip-flop $Mr_i$ which is set by a distribution signal from incoming address lead $h_i$ and is periodically reset by the synchronization and cancellation signal R on lead *r*. Gate-control circuit $Dr_i$ is further triggerable by stepping pulses E from lead *e*. A starting circuit AVr receives a gate impulse G from conductor *q*, this pulse also opening a gate $PCr_i$ through which signals from a storage circuit $CMr_i$ are delivered to filter $Fr_i$ for reconstitution into a low-frequency sinusoidal wave. Storage circuit $CMr_i$, which is similar to circuit $CMt_i$ in the transmitting section, is energized from talking conductor *f* via a gate $Pr_i$ controlled by the associated counting stage $Dr_i$.

The output lead $dr_i$ of circuit $Dr_i$ is extended to a control electrode of a gate $P_i'$ which passes the signal from conductor *f* to a pair of integrating networks $I_i'$ and $I_i''$ connected in parallel, network $I_i'$ having a relatively short time constant (e.g., of about 10 milliseconds) whereas network $I_i''$ has a relatively long time constant (e.g., on the order of 1 second). The output of integrating circuit $I_i'$ is applied via a gate $P_i''$ and an OR circuit OD to one input of comparator D whose other input is energized directly from conductor *c;* gate $P_i''$ is controlled, in turn, by the output of integrating network $I_i''$ in a manner more fully described hereinafter with reference to FIG. 3.

Figure 2:
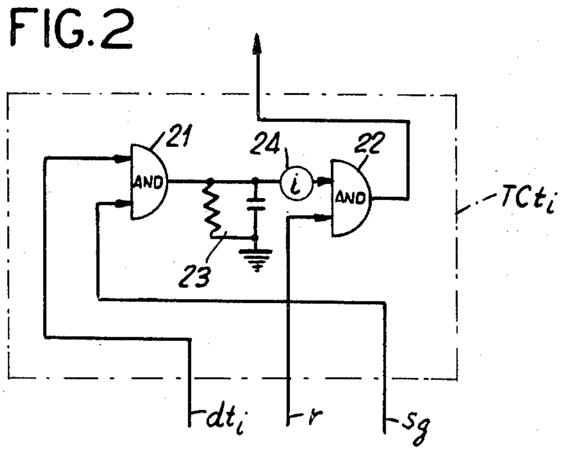

As illustrated in FIG. 2, a time-constant network $TCt_i$ comprises a first AND circuit 21, connected to conductors $dt_i$ and *sq*, as well as a second AND circuit 22 receiving the cancellation signal (R) from lead *r* along with the signals from AND circuit 21 which have been integrated in an R-C circuit 23, this circuit being connected to AND circuit 22 through an inverter 24.

Figures 3, 4, 5:
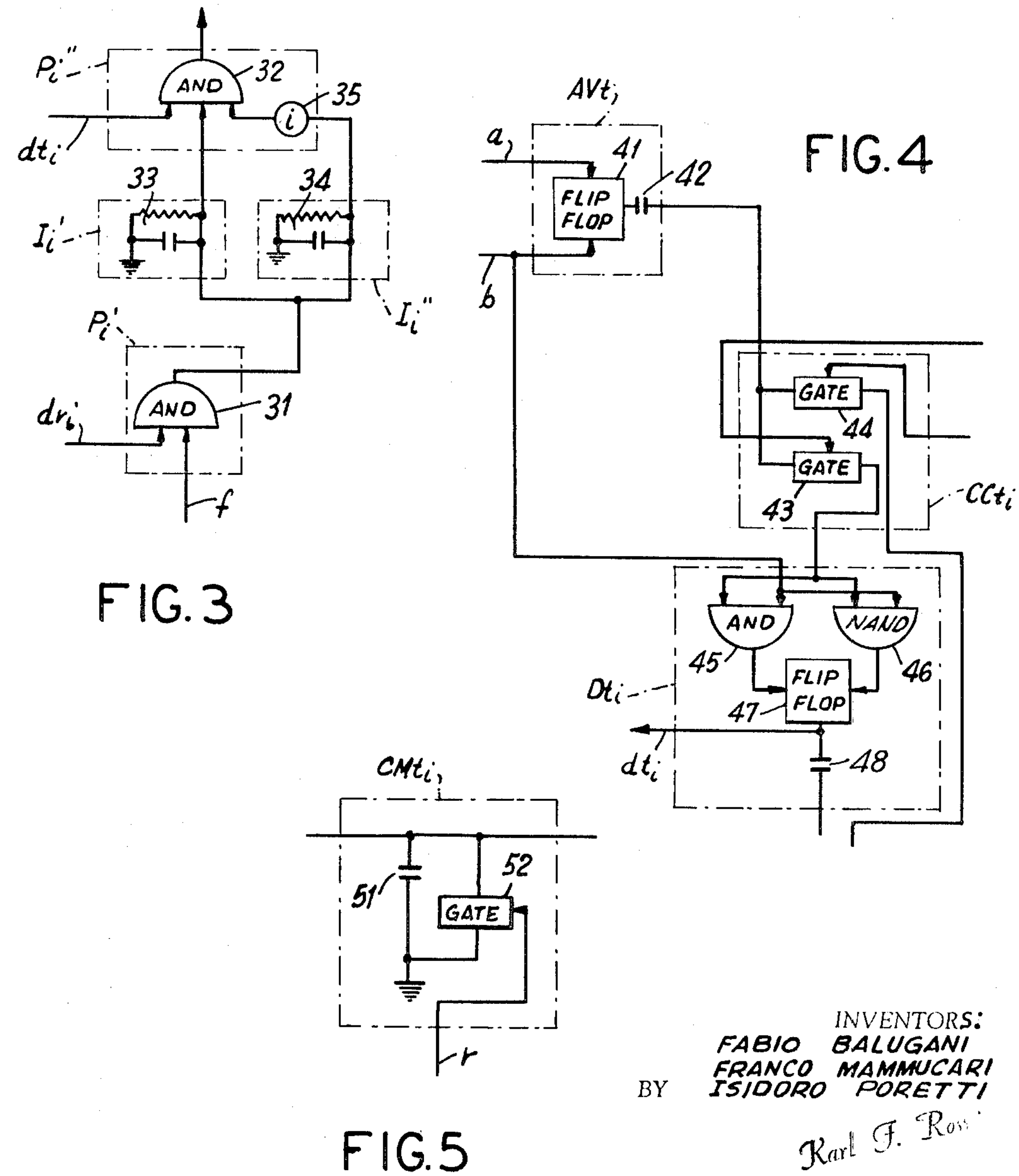

FIG. 3 illustrates the gates $P_i'$ and $P_i''$ as comprising respective AND circuits 31, 32. AND circuit 31 receives signals from leads $dr_i$ and *f*, impressing its output on the two integrating networks $I_i'$ and $I_i''$ each comprising a respective R-C circuit 33, 34. AND circuit 32 receives direct signals from lead $dt_i$ and from network 33, a further input of this AND circuit being connected to network $I_i''$ through an inverter 35.

As shown in FIG. 4, starting circuit AVt (which is also representative of circuit AVr) comprises a flip-flop 41 connected to be set by a pulse (A) from a lead *a* and to be reset by a pulse (B) from lead *b;* the output circuit of this flip-flop includes differentiation means, shown as a condenser 42, for generating a first counting pulse upon the resetting of the flip-flop. Switch $CCt_i$, to which this counting pulse is transmitted around the gate control circuits of the preceding stages (assuming their respective stages to be in bypass condition), comprises a pair of gates 43, 44 which are alternately unblocked according to the state of the associated flip-flop $Mt_i$ (see FIG. 1). With gate 43 conductive, the counting pulse is routed to unit $Dt_i$ which includes an AND circuit 45 and a NAND circuit 46 both connected in parallel to receive the output of switch $CCt_i$ along with a stepping pulse B from lead *b*. If this stepping pulse coincides with the aforementioned counting pulse, or with a similar counting pulse from an activated preceding stage, AND circuit 45 conducts to set an associate flip-flop 47; if only the pulse B is received because of the absence of a concurrent counting pulse from switch $CCt_i$, NAND circuit 46 operates to reset the flip-flop 47 if the latter had been previously set. A condenser 48 in the output of flip-flop 47 has the same function as condenser 42 in circuit AVt, i.e., serves to generate a counting pulse for a succeeding stage.

Circuits $CCt_i$ and $Dt_i$ are also representative of units $CCr_i$ and $Dr_i$ in the receiving section of the terminal as well as elements $SCt_i$ and $PSt_i$ in the associated preselection chain.

FIG. 5 illustrates the storage circuit $CMt_i$ as comprising a condenser 51 connected in parallel with a gate 52, the latter being connected to lead *r* to discharge the condenser in response to a resetting pulse R (FIG. 6). This circuit is also representative of element $CMr_1$ in FIG. 1.

The operation of the system of FIG. 1 will now be described with reference to the pulse diagram of FIG. 6.

As shown in FIG. 6, a frame or operating cycle of the timer has a duration of 100 $\mu$ sec. and is subdivided into two periods, i.e., a relatively short first period MD (here of 25 $\mu$ sec.) for the transmission of a distribution message and a relatively long second period MC (here of 75 $\mu$ sec.) for the transmission of intelligence signals.

The frame starts with the generation of the synchronization and distribution signal R on lead *r* to discharge all the storage circuits $CMt_1$ —$CMt_n$ and $CMr_1$ —$CMr_n$, to reset all the flip-flop $Mr_1$ —$Mr_n$ of the counting chain in the receiving section, and to reset certain of the corresponding flip-flops $Mt_1$ —$Mt_n$ in the transmitting section under conditions explained further on. Immediately thereafter, a scanner (not shown) tests all the outgoing address leads $i_1$ —$i_n$ to produce a pulse train, as shown on line *i*, in which pulses of a given polarity (here positive) identify all the transmitting flip-flops not reset in the aforedescribed manner. At the same time, a similar pulse train as illustrated in line *h* is received from the trunk and, via a distributor not shown, selectively energizes certain of the incoming address leads $h_1$ —$h_n$ according to the pattern of positive pulses in that train. As a result, the corresponding receiving flip-flops $Mr_1$ —$Mr_n$ are now set to activate the associated counting stages.

During the same period MD, a sampling pulse A appears on lead *a* and, in momentarily unblocking all the gates $PCt_1$ —$PCt_n$, causes the recharging of all the storage circuits $CMt_1$ —$CMt_n$ which had previously been discharged.

Upon the beginning of frame interval MC, a series of stepping pulses B and E appear on leads *b* and *e*, respectively. If the flip-flop $Mt_1$ of the first stage has been set, the counting pulse generated by element AVt in response to the first stepping pulse $B_1$ (which resets the flip-flop 41 thereof) is applied to gate control $Dt_1$ concurrently with this stepping pulse so that gate $Pt_1$ is opened to communicate the contents of storage circuit $CM_1$ to conductor *c*. If, on the other hand, flip-flop $Mt_1$ had been reset, switch $CCt_1$ would have been in its bypass condition and the counting pulse would have reached the first gate control (e.g., $Dt_i$) whose routing switch was in its activating condition, i.e., wherein gate 43 (FIG. 4) rather than 44 was unblocked by the associated flip-flop $Mt_i$. Thus, the two inputs of AND gate 45 are concurrently pulsed whereby flip-flop 47 is set to energize its output lead dt $dt_i$. The next stepping pulse B, being unaccompanied by a counting pulse from a preceding stage, trips the NAND gate 46 to reset the flip-flop 47, with consequent generation of another counting plate pulse in the output of stage $Dt_i$ to help activate the next counting stage whose flip-flop has been set.

In like manner, the stepping pulses E applied to unit AVr and to the gate controls in the counting chain of the receiving section advance that chain while skipping all those stages thereof whose flip-flops $Mr_1$ —$Mr_n$ had not been set by the distribution message from the remote terminal.

The coding equipment in the outgoing trunk channel translates the voltage samples on conductor *c* into combinations of code pulses C which, in the known manner, represent the digital equivalent of the voice signals to be transmitted. Conversely, the decoding equipment in the incoming trunk channel derives voltages of predetermined magnitude from the different code combinations F arriving over conductor *f*. These code combinations C and F may be accompanied, as disclosed in the prior U.S. application referred to, by invariable timing pulses which have been shown slightly larger than the digital pulses for purposes of distinction.

The number of stepping pulses B and E in each frame is constant and equal to *m* which, preferably, corresponds to *n*/2. Let us assume that the number of activated counting-chain stages in the transmitting section equals *p* which, in turn, is less than *m*. Upon the *p* stepping pulse $B_p$, therefore, a counting pulse will emerge from the OR circuit $Ot_n'$ of the last stage and will set the flip-flop at which thereupon opens the gate Bt so that all further stepping pulses B are now also transmitted to bus bar *b'* where they appear as pulses B' to advance the preselection chain $SCt_1$ —$SCt_n$ in essentially the manner as has been described with reference to the counting chain. The stages of this preselection chain are cyclically interconnected and the routing switches $SCt_1$ —$SCt_n$ thereof are in their activating condition whenever the corresponding flip-flop $Mt_1$ —$Mt_n$ is not set; thus, pulses B' cause the successive activation of $(m-p)$ preselector stages, skipping all those stages whose counterparts in the counting chain are active. The activation of any such preselector stage sets the corresponding flip-flop $Mt_1$ —$Mt_n$ at a point of the cycle prior to the occurrence of cancellation signal R; after the last pulse B, the preselection chain remains in the condition last established therein for further advancement during a subsequent cycle in which $p < m$.

Finally, a pulse G on conductor *q* opens all the gates $PCr_1$ —$PCr_n$ to transmit the stored voltages from circuits $CMr_1$ —$CMr_n$ via filters $Fr_1$ —$Fr_n$ to the respective hybrid coils $H_1$ —$H_2$ of a maximum of *m* subscriber lines as determined by the distribution message received at the beginning of the frame.

Differential amplifier D has an output whenever the difference between the signal levels on conductors *c* and *f* (the latter as integrated in circuits 1 $I_i'$—$I_n''$) is positive, i.e., when the level on conductor *c* is higher. With these integrating circuits designed to charge rapidly (i.e., in the period of approximately one frame) but to discharge over a considerably longer period e.g., of 10 milliseconds, the charge thereon represents the cumulative signal voltage from a large number of operative cycles; this integrated voltage is suitably reduced in the input of amplifier D to represent an average signal level comparable to that existing on conductor *c* if the voltage of the latter is due exclusively to echoes of incoming signals reflected by the corresponding hybrid coil. In the presence of original outgoing signals on conductor *c*, therefore, the output of amplifier D will be energized to open the gate PD so that the voltage of conductor *c* is transmitted to threshold device SG. If this voltage is sufficiently higher than the average noise level to clear the threshold, the potential on lead *sq* allows a pulse from flip-flop 47 (FIG. 4) to pass the AND gate 21 (FIG 2) and to begin to charge the R-C network 23. After several frames this charge is sufficient to block the AND gate 22, owing to the interposition of inverter 24, so that cancellation pulse R on lead *r* can no longer traverse the circuit $TCt_i$ to reset the flip-flop $Mt_i$ if the same had been previously set by one of the pulses B or B' Conversely, this charge will decay only after several cycles (if the subscriber on line $L_i$ has ceased talking) whereby gate control $Dt_i$ will not be deactivated during cycles between syllables.

As indicated above, it may be advantageous to make deactivation of counting-chain stages $Dt_i$ —$Dt_n$ independent of relative signal strength on conductors *c* and *f* if, for example, a message arriving from the remote terminal consists of data transmitted by machine which is intended to respond to control signals from the local subscriber. This is accomplished with the aid of integrating circuits $I_1''$—$I_n''$ which, if sufficiently charged, block the respective gates $p_i''$—$p_n''$ so as to inhibit the transmission of signals to OR CIRCUIT OD in response to pulses or leads $dt_1$ —$dt_n$. Integrating circuit $I_1''$—$I_n''$ while charging just as rapidly as circuits $I_1' - I_n'$, may discharge at the rate on the order of 1 second so as not to become effective during ordinary conversation.

Naturally, the terminal arrangement shown in FIG. 1 and the specific circuit details illustrated in FIGS. 2–5 can be modified in various ways without departing from the spirit and scope of our invention as defined in the appended claims.

Thus, for example, starting circuits AVt and AVr could be in the form of simple monostable multivibrators, with omission of their connection to conductors $b$ and $e$, respectively.

We claim:

1. A two-way communication system comprising a trunk line with a pair of channels for signal transmission in opposite directions, a terminal at each end of said trunk line having a transmitting section and a receiving section, a group of $n$ subscriber lines with outgoing and incoming branches respectively terminating at said transmitting section and said receiving section, timer means for periodically sampling the signal level on each of said outgoing branches, first switching means at said transmitting section for sequentially connecting a maximum number $m < n$ of outgoing branches to said trunk line during each operating cycle of said timer means, second switching means at said receiving section for sequentially connecting up to $m$ incoming branches to said trunk line during each operating cycle under the control of distributing information from the opposite terminal, comparison means bridged across said channels and common to all subscriber lines for ascertaining the difference between the respective signal levels of their incoming and outgoing branches, and circuit means controlled by said comparison means for enabling said first switching means to connect the respective outgoing branch to said trunk line during an operating cycle in which said difference is of a sign representing a higher signal level on such outgoing branch.

2. The system defined in claim 1 wherein said circuit means includes a threshold device for generating control pulses to enable said first switching means upon the signal level on a given outgoing branch surpassing a predetermined magnitude.

3. The system defined in claim 2 wherein said circuit means further includes a time-constant network in the output of said threshold device for integrating said control pulses over a succession of operating cycles, said first switching means being provided with actuating means responsive to the cumulative value of said control pulses from a plurality of cycles.

4. The system defined in claim 1 wherein each of said incoming branches is provided with integrating means for accumulating received signals, said comparison means being connectable to an output of si said integrating means.

5. A two-way communication system comprising a trunk line with a pair of channels for signal transmission in opposite directions, a terminal at each end of said trunk line having a transmitting section and a receiving section, a group of $n$ subscriber lines with outgoing and incoming branches respectively terminating at said transmitting section and said receiving section, timer means for periodically sampling the signal level on each of said outgoing branches, first switching means at said transmitting section for sequentially connecting a maximum number $m<n$ of outgoing branches to said trunk line during each operating cycle of said timer means, second switching means at said receiving section for sequentially connecting up to $m$ incoming branches to said trunk line during each operating cycle under the control of distributing information from the opposite terminal, comparison means connectable across the outgoing and incoming branches of any subscriber line for ascertaining the difference between their respective signal levels, and circuit means controlled by said comparison means for enabling said first switching means to connect the respective outgoing branch to said trunk line during an operating cycle in which said difference is of a sign representing a higher signal level on such outgoing branch; said circuit means including a threshold device for generating control pulses to enable said first switching means upon the signal level on a given outgoing branch surpassing a predetermined magnitude, said circuit means further including a time-constant network in the output of said threshold device for integrating said control pulses over a succession of operating cycles, said first switching means being provided with actuating means responsive to the cumulative value of said control pulses from a plurality of cycles.

6. The system defined in claim 5 wherein said actuating means comprises a bistable element, test means for setting said element in the course of an operating cycle, a source of cancellation signals connected to said element for subsequently resetting same, and gate means controlled by said time-constant network for blocking the transmission of a cancellation signal to said element in response to said cumulative value.

7. The system defined in claim 6 wherein said first switch means comprises a counting chain of $n$ stages triggerable in a predetermined order to open a transmission gate for passing a signal sample of a respective outgoing branch and routing means for selectively bypassing any of said stages whereby the transmission gate thereof remains closed, said bistable element having a first output connected to the routing means of a respective stage and a second output connectable to the trunk line for the transmission of distributing information to the opposite terminal.

8. The system defined in claim 7 wherein said routing means comprises a preselector chain of $n$ cyclically interconnected stages for the control of said bistable element of a respective subscriber line, said time means including a source of $m$ stepping pulses per cycle and switchover means effective upon completion of stepping of the counting chain to apply said stepping pulses to said preselector chain whereby, upon an activation of $p<m$ counting-chain stages, the bistable elements of a remainder of $(m-p)$ subscriber lines are set prior to generation of said cancellation signal.

9. The system defined in claim 8 wherein said source of $m$ stepping pulses is controlled by said timer means to generate said cancellation signal just prior to transmission of said distributing information at the beginning of each cycle.

10. A two-way communication system comprising a trunk line with a pair of channels for signal transmission in opposite directions, at a terminal at each end of said trunk line having a transmitting section and a receiving section, a group of $n$ subscriber lines with outgoing and incoming branches respectively terminating at said transmitting section and said receiving section, timer means for periodically sampling the signal level on each of said outgoing branches, first switching means at said transmitting section for sequentially connecting a maximum number $m < n$ of outgoing branches to said trunk line during each operating cycle of said timer means, second switching means at said receiving section for sequentially connecting up to $m$ incoming branches to said trunk line during each operating cycle under the control of distributing information from the opposite terminal, comparison means connectable across the outgoing and incoming branches of any subscriber line for ascertaining the difference between their respective signal levels, and circuit means controlled by said comparison means for enabling said first switching means to connect the respective outgoing branch to said trunk line during an operating cycle in which said difference is of a sign representing a higher signal level on such outgoing branch; each of said incoming branches being provided with integrating means for accumulating received signals, said comparison means being connectable to an output of said integrating means.

11. The system defined in claim 10 wherein said integrating means comprises a first integrating network with a relatively short time constant connectable to said comparison means, a second integrating network with a relatively long time constant, and blocking means responsive to a predetermined minimum cumulative signal value in said second integrating network for disabling the connection between said first integrating network and said comparison means.

12. The system defined in claim 11 wherein said first integrating network has a time constant on the order of an operating cycle of said timer means.

13. The system defined in claim 11 wherein said timer means has an operating cycle on the order of 100 microseconds, said second integrating network having a time constant on the order of 10 milliseconds.